(12) United States Patent
Laimböck

(10) Patent No.: US 6,305,493 B1
(45) Date of Patent: Oct. 23, 2001

(54) EXHAUST SYSTEM FOR INTERNAL COMBUSTION ENGINES

(75) Inventor: Franz Laimböck, Thal (AT)

(73) Assignee: AVL List GmbH, Graz (AT)

(*) Notice: Subject to any disclaimer, the term of this patent is extended or adjusted under 35 U.S.C. 154(b) by 0 days.

(21) Appl. No.: 09/500,434

(22) Filed: Feb. 9, 2000

(30) Foreign Application Priority Data

Feb. 11, 1999 (AT) .......................................... 91/99 U

(51) Int. Cl.[7] .................................................. F01N 3/02
(52) U.S. Cl. ............................. 181/230; 181/264; 60/299
(58) Field of Search ................................ 181/230, 231, 181/240, 264, 269, 272, 282, 266, 273, 276; 60/299, 302

(56) References Cited

U.S. PATENT DOCUMENTS

| | | |
|---|---|---|
| 1,280,386 * | 10/1918 | Buehner ........................... 181/240 |
| 1,821,688 * | 9/1931 | Bourne ............................ 181/264 |
| 3,665,712 | 5/1972 | Tenney . |
| 3,842,599 | 10/1974 | Ehlen . |
| 4,165,798 * | 8/1979 | Martimez ........................... 181/282 |
| 4,418,790 * | 12/1983 | Agnew .............................. 181/268 |
| 4,424,882 | 1/1984 | Moller . |
| 5,736,690 * | 4/1998 | Karlsson ........................... 181/230 |

FOREIGN PATENT DOCUMENTS

| | | |
|---|---|---|
| 399914 | 8/1995 | (AT) . |
| 614775 | 5/1935 | (DE) . |
| 2643240 | 4/1978 | (DE) . |
| 2828006 | 1/1979 | (DE) . |
| 219052 | 2/1985 | (DE) . |

* cited by examiner

Primary Examiner—Khanh Dang
(74) Attorney, Agent, or Firm—Dykema Gossett PLLC

(57) ABSTRACT

An exhaust system for internal combustion engines, in particular two-cycle internal combustion engines, includes a resonance-type exhaust part having at least one diffuser-cone unit formed with a diffuser, a countercone, and a connecting part with a preferably constant cross section extending between the diffuser outlet cross section and cone inlet cross section. In order to provide the resonance-type exhaust part as compact as possible by employing a simple production method, the connecting part is formed as a first deflection arc, preferably with an angle of deflection of about 180°±30°.

22 Claims, 2 Drawing Sheets

EXHAUST SYSTEM FOR INTERNAL COMBUSTION ENGINES

BACKGROUND OF THE INVENTION

The invention relates to an exhaust system for internal combustion engines, in particular two-cycle internal combustion engines, with a resonance-type exhaust part which includes at least one diffuser-cone unit with a diffuser and a countercone, with a connecting part having a preferably constant cross section arranged between the diffuser outlet cross section and cone inlet cross section.

DESCRIPTION OF THE PRIOR ART

In an exhaust system of the kind mentioned above, an exhaust pipe with an initially constant progress of cross section is led away from the port via an outlet conduit. To produce a returning suction wave, a diffuser is connected thereto which opens into a countercone or baffle plate after a short transition element. A pressure wave running from the cylinder is produced in said constriction of cross section, which wave supplies the cylinder chamber with fresh air which reaches the exhaust system during the scavenging phase from the inlet slot through the cylinder chamber.

U.S. Pat. No. 4,424,882 A shows an arrangement for an exhaust system. This arrangement describes exhaust mufflers in which the exhaust gas from the engine flows into a large volume and from there further into a second chamber through at least two similarly long nozzles, such as diffuser-type tubes, situated adjacent to one another. Systems of this type aim at obliterating the gas-dynamic activity, as a result of which they cannot be used for reducing the scavenging losses and for the improvement of the torque characteristics.

AT 399 914 B describes an exhaust system for two-cycle internal combustion engines with a muffler pipe, with the initial region thereof being bordered by conical regions formed by diffusers, which regions are connected on the one hand via piping of different length with the initial region of the muffler pipe and open on the other hand into a common collecting vessel to which the tail pipe, comprising a catalyst and/or a muffler, is connected. This system ensures that a pressure wave coming from the cylinder is reflected twice as a suction wave and reaches the still open exhaust port in a time staggered manner as a result of the different run length. In this way the duration of action of the suction wave in comparison with other exhaust systems which utilize the exhaust reflection wave is extended with a single resonance chamber in order to convey back the fresh gases to the cylinder which have entered the exhaust towards the end of the scavenging phase.

Exhaust systems with resonator-type exhaust parts which are provided with at least one diffuser-cone unit require a relatively large amount of space due to the relatively high length of the diffuser and the conical part.

From DE 614 775 C a sound absorber is known with several chambers which are arranged behind one another in the direction of flow of the exhaust gases, with a deflection arc being provided after each chamber. Embodiments of exhaust systems with deflection arcs before each diffuser are shown in the already mentioned AT 399 914 B in order to arrange the diffusers mutually parallel on a common collecting vessel.

SUMMARY OF THE INVENTION

It is the object of the present invention to provide a compact exhaust system with a resonator-type exhaust part which is easy to produce.

This is achieved in accordance with the invention in such a way that the connecting part is arranged as a first deflection arc, preferably with an angle of deflection of about 180° ± 30°. The resonator-type exhaust part can thus be provided with a very compact arrangement. A particularly compact solution is obtained when a second deflection art is provided in the initial zone of the diffuser whose angle of deflection is preferably 180°±30°. It is particularly advantageous if the center line of the second deflection arc is substantially arranged in a second plane which is disposed inclined to a first plane which is defined by the center line of the first deflection arc, with the second plane preferably being arranged approximately normal to the first plane.

It is preferably further provided that in the end zone of the countercone a third deflection arc is arranged whose angle of deflection is preferably 180° ± 30°. The third deflection arc can be arranged in a third plane which is inclined to the first plane, with the third plane preferably enclosing an angle of approx. 90° to the first plane and being arranged particularly preferably approximately parallel to the second plane. This leads to an arrangement in which the central line of the resonance-type exhaust part is connected in at least three planes and the exhaust gas flows through the resonance-type exhaust part in at least four passes, with the first and fourth pass being formed by the inlet part and the end part, the second pass comprising the diffuser and the third pass the countercone. The resonance-type exhaust part can thus be provided with a particularly compact design.

An embodiment that is particularly easy to produce provides that the diffuser and preferably also the inlet part and/or the second deflection arc and/or at least partly the first deflection arc are formed by a diffuser insert which is preferably arranged as a deep-drawing part. The countercone, as preferably also the end piece and/or the third deflection arc and/or at least partly the first deflection arc, can be formed by a cone insert which is preferably arranged as a deep-drawing part. Diffuser insert and cone insert are joined with screws for example, with a separating plate being arranged between the diffuser insert and the cone insert.

In order to avoid burbling and turbulence in the zone of the strongly bent deflection arcs, it can further be provided that in the zone of the first, second and/or third deflection arcs baffle plates are arranged, with the baffle plates preferably being fastened to the separating plate.

In a further development of the invention it is also possible that the diffuser is arranged as a double diffuser, with a secondary diffuser, preferably with the same inlet/outlet cross-sectional ratio as the diffuser, being arranged within the diffuser, with the secondary diffuser preferably being fastened to the separating plate.

In a particularly preferred embodiment it is provided that the resonance-type exhaust part is provided with at least two diffuser-cone units which are switched in parallel in respect of flow and are preferably arranged symmetrically with respect to a central plane and branch off from a common inlet piece and open into a common end piece, with the branches and/or the opening being arranged in the zone of the central plane. In this manner two or more diffuser-cone units can be arranged in a common housing in a particularly compact manner. The diffusers and countercones can also be formed in this case by separate inserts which are arranged as deep-drawing parts for example, thus allowing a particularly simple and inexpensive production.

In order to improve the exhaust gas quality it can be further provided that the separating plate, the diffuser insert, the cone insert, the baffle plates and/or the secondary diffuser are catalytically coated.

It is naturally also possible that the resonance-type exhaust part consists of ceramic at least in sections.

The tail pipe is preferably disposed in the zone of the central plane and in a central section of the resonance-type exhaust part, so that a heat discharge occurs according to the principle of reverse flow.

BRIEF DESCRIPTION OF THE DRAWINGS

The invention is now explained below in closer detail by reference to the enclosed drawings, wherein.

DETAILED DESCRIPTION OF THE PREFERRED EMBODIMENTS

Figure 3:
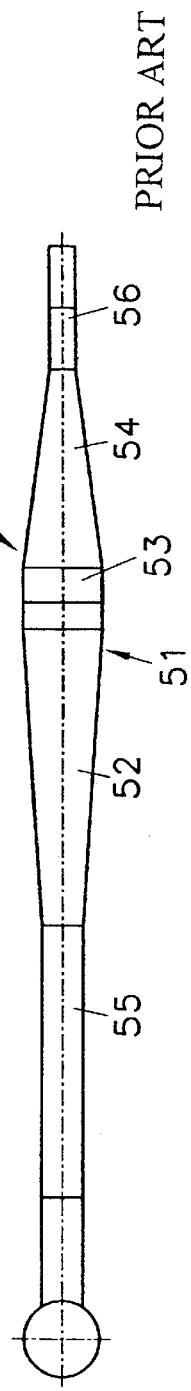

FIG. 3 shows a known resonance-type exhaust part 50 which is provided with a diffuser-cone unit 51 formed of a diffuser 52, connecting part 53 and countercone 54. Reference numeral 55 indicates the inlet pipe and reference numeral 56 of the tail pipe of this known exhaust system with a stretched diffuser-cone unit 51. The disadvantage is the relatively high amount of required space.

Figure 1:
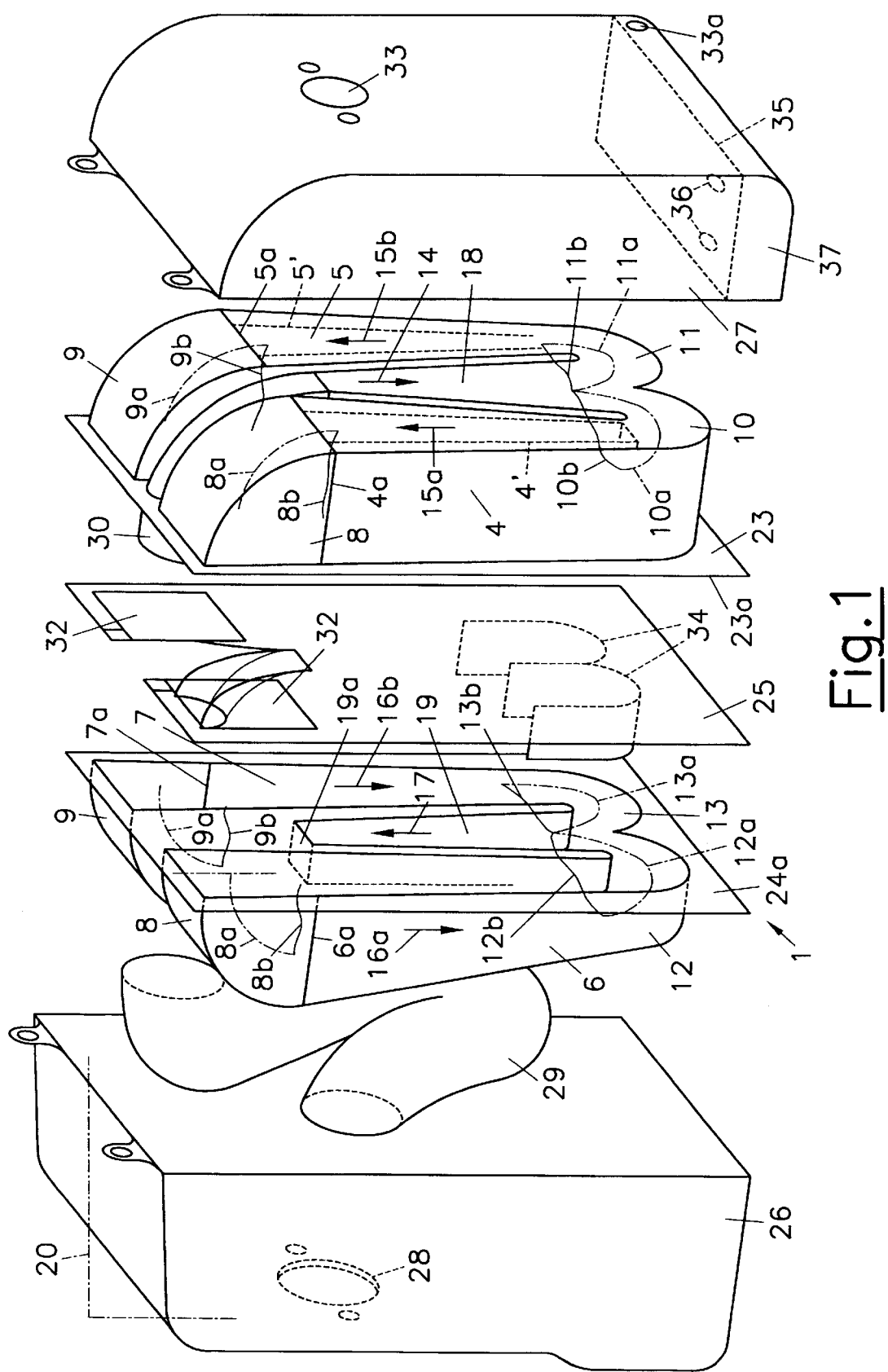
FIG. 1 shows an exploded view of the resonance-type exhaust part.

The resonance-type exhaust part 1 according to the present invention is shown in FIG. 1 and is provided with two diffuser-countercone units 2, 3. Each diffuser-countercone unit 2, 3 includes a diffuser 4, 5 and a countercone 6, 7. A connecting part in the form of a first deflection arc 8, 9 is provided between the diffuser outlet cross section 4a, 5a and the cone inlet cross section 6a, 7a, the connecting part having an angle of deflection of 180° ± 30°.

A second deflection arc 10, 11 is provided in the initial zone of each diffuser 4, 5. A third deflection arc 12, 13 is further arranged in the end zone of the countercone 6, 7. Second deflection arc 10, 11 and third deflection arc 12, 13 are each provided with an angle of deflection of 180° ± 30°. The angle of deflection is always defined by the change in direction of the central line 8a, 9a, 10a, 11a, 12a, 13a between inlet and outlet into the deflection arcs 8, 9, 10, 11, 12, 13.

Figure 2:
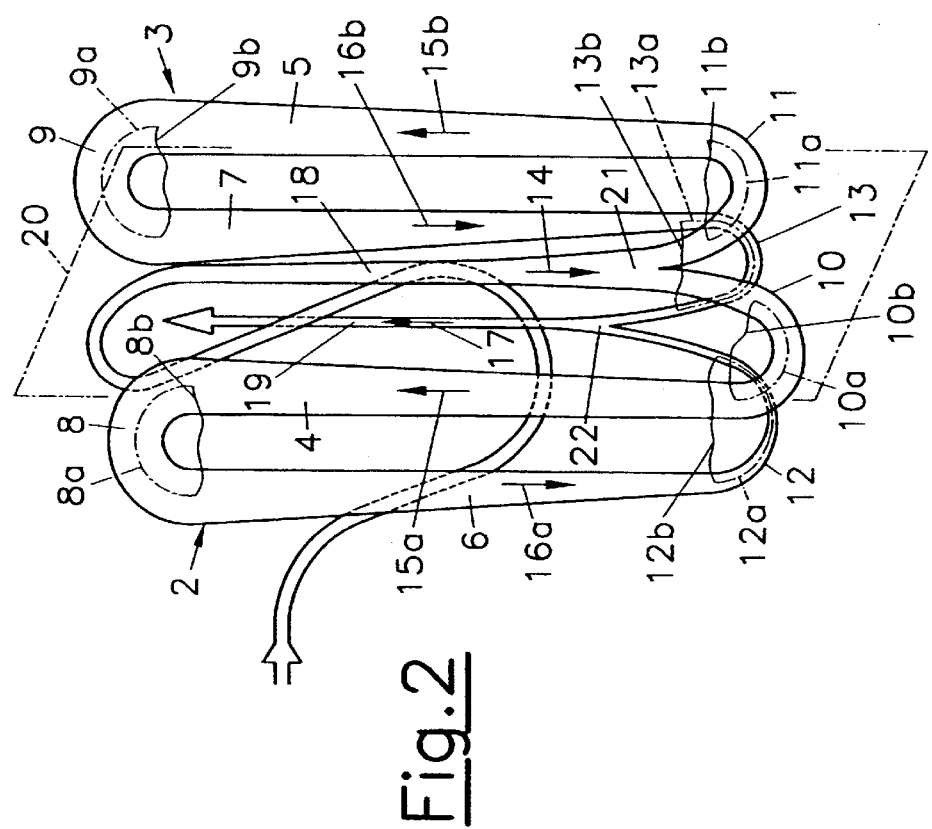
FIG. 2 shows a schematic view of the flow paths in the resonance-type exhaust part and FIG. 3 shows a known resonance-type exhaust part.

The central lines of the first deflection arcs 8, 9 are designated with 8a, 9a, the central lines of the second deflection arcs 10, 11 with 10a, 11a and the central lines of the third deflection arcs with 12a, 13a. The central lines 8a, 9a, 10a, 11a, 12a and 13a each form a first plane 8b or 9b, a second plane 10b or 11b and a third plane 12b or 13b. The second planes 10b and 11b and the third planes 12b and 13b are provided an arrangement which is inclined preferably by an angle of about 90° to the first plane 8b. The second planes 10b and 11b are arranged approximately parallel to the third plane 12b, 13b. Accordingly, the resonance-type exhaust part 1 is provided with at least four passes which are indicated by the arrows 14, 15a, 15b, 16a, 16b and 17 in FIG. 2. The first pass of flow 14 is formed by a common end part 19. As is shown in FIGS. 1 and 2, the resonance part 1 is provided with two diffuser-cone units 2, 3 which in respect of flow are switched in parallel and which are arranged symmetrically with respect to a central plane 20. The diffuser-cone units 2 start out from the common inlet part 18 and open into the common end part 19. The branch 21 of inlet part 18 and the opening 22 into the end part 19 are located in the zone of the central plane 20.

In the embodiment as shown in FIG. 1, the two diffusers 4, 5, the inlet part 18 as well as the two deflection arcs 10, 11 are formed by a diffuser insert 23 arranged as a deep-drawing part. The countercones 6, 7 and the end part 19 are formed by a cone insert 24 arranged as a deep-drawing part. The flange facings 23a and 24a of the diffuser insert 23 and the cone insert 24 face one another and are mutually detachably connected, with a separating plate 25 being arranged between the diffuser insert 23 and the cone insert 24. The second and third planes 10b, 11b, 12b, 13b are arranged approximately parallel to the flange facings 23a and 24a. The first planes 8b and 9b are arranged approximately parallel to the central plane 20 and normal to the flange facings 23a, 24a. The separating plate 25 partly separates the interior chambers of the diffusers 4, 5 and the countercones 6,7 from one another and thus creates meander-like flow paths. All parts of the resonance part 1 are housed in one housing which consists of the input-side housing part 26 and the output-side housing part 27.

Exhaust gases coming from engine flow through the inlet opening 28 in the input-side housing part 26 and through the inlet line 29. The inlet line 29 is connected to the connection piece 30 of the diffuser insert 23, thus allowing the exhaust gases to travel further through the inlet part 18, the second deflection arcs 10, 11 and into the diffusers 4, 5. From there the exhaust gases flow through the first deflection arcs 8, 9 which are formed on the one part by the diffuser insert 23 and on the other part by the cone insert 24, with respective pass-through windows 31, 32 are passed through the separating plate 25. The exhaust gases further reach the countercones 6, 7 via the first deflection arcs 8, 9 and further to the third deflection arcs 12, 13 and to the opening 22 into the end piece 19. The exhaust gases now leave the outlet cross section 19a of the end part 19 and, by flowing around the diffuser-cone units 2, 3 parallel to the central plane 20, reach the outlet opening 33 of the output-side housing part 27 where they leave the resonance-type exhaust part 1 into the exhaust line not illustrated in further detail.

Flow baffle plates 34 can optionally be inserted in the zone of the deflection arcs 8, 9, 10, 11, 12, 13 in order to favorably influence the flow. The baffle plates 34 can be fastened to the separating plate 25, as is indicated by the broken lines in FIG. 1 for the deflection arcs 12, 13 for example. In order to achieve a favorable heat transmission, diffuser insert 23, cone insert 24 and the separating plate 25 are preferably made of thin-walled sheet metal.

It is further possible to arrange the diffusers 4, 5 as double diffusers, with a secondary diffuser 4' which has the same cross-sectional ratio between inlet and outlet and is made of sheet metal being each inserted between the diffusers 4, 5.

It is also possible to provide parts of the resonance-type exhaust part 1 such as the diffuser insert 23, cone insert 24 or the separating plate 25 with a catalytic coating. In addition or as an alternative, a metal carrier catalyst can be welded into the sheet metal parts or a ceramic catalyst can be inserted between the sheet metal parts. Obviously, individual parts of the resonance-type exhaust system can be made of ceramics.

In order to improve the exhaust gas quality it is possible to supply blower cooling air also in the zone of the end part 19 or in the zone of the output-side housing 27.

It is further possible, for the purpose of further sound reduction in the zone of the output-side housing part 27, to provide a reflection plate 35, as is indicated in FIG. 1 with the broken line. The exhaust gas flows in this case through the apertures 36 of the reflection plate 35 into a reflection chamber 37 and leaves the housing part 27 through the output opening 33a. The output opening 33 is omitted in this embodiment.

What is claimed is:

1. An exhaust system for an internal combustion engine with a resonance-type exhaust part, comprising:
    at least one diffuser-cone unit with a diffuser, a countercone, and a connecting part for providing a first deflection arc between a diffuser outlet cross section and countercone inlet cross section;
    means forming a second deflection arc in an initial zone of the diffuser; and
    means forming a third deflection arc in an end zone of the countercone,
    a central line of the second deflection arc being arranged substantially in a second plane which is inclined to a first plane defined by
    a central line of the first deflection arc, with the second plane being arranged approximately normal to the first plane, and
    a third deflection arc being arranged in a third plane which is inclined to the first plane, with the third plane enclosing an angle of approximately 90° to the first plane and being arranged approximately parallel to the second plane.

2. The exhaust system according to claim 1, wherein the first deflection arc has an angle of deflection of approximately 180° ± 30°.

3. The exhaust system according to claim 1, wherein the second deflection arc has an angle of deflection of 180° ± 30°.

4. The exhaust system according to claim 1, wherein the third deflection arc has a deflection angle of 180° ± 30°.

5. The exhaust system according to claim 1, wherein a flow path through the resonance-type exhaust part is arranged with at least four passes, with a first and fourth pass being formed by an inlet part and an end part, and a second pass comprising the diffuser and a third pass the countercone.

6. The exhaust system according to claim 1, wherein the diffuser is formed by a diffuser insert.

7. The exhaust system according to claim 6, wherein also the inlet part is formed by the diffuser insert.

8. The exhaust system according to claim 6, wherein the second deflection arc is formed by the diffuser insert.

9. The exhaust system according to claim 6, wherein at least partly the first deflection arc is formed by the diffuser insert.

10. The exhaust system according to claim 6, wherein the diffuser insert is arranged as a deep-drawing part.

11. The exhaust system according to claim 1, wherein the countercone is formed by a cone insert.

12. The exhaust system according to claim 11, wherein also the end part is formed by the cone insert.

13. The exhaust system according to claim 11, wherein also the third deflection arc is formed by the cone insert.

14. The exhaust system according to claim 11, wherein also at least partly the first deflection arc is formed by the cone insert.

15. The exhaust system according to claim 11, wherein the cone insert is arranged as a deep-drawing part.

16. The exhaust system according to claim 1, wherein the diffuser insert and the cone insert are mutually connected, with a separating plate being arranged between the diffuser insert and the cone insert.

17. The exhaust system according to claim 1, wherein baffle plates are arranged in the zone of the first, second and third deflection arcs, with the baffle plates being fastened to the separating plate.

18. The exhaust system according to claim 1, wherein the diffuser is arranged as a double diffuser, with at least one secondary diffuser with the same inlet/outlet cross-sectional ratio as the diffuser, being arranged within the diffuser, with the secondary diffuser being fastened to the separating plate.

19. The exhaust system according to claim 1, wherein the resonance-type exhaust part is provided with at least two diffuser cone units which are switched in parallel in respect of flow and are arranged symmetrically with respect to a central plane and branch off from a common inlet piece and open into a common end piece, with the branches and the opening being arranged in the zone of a central plane.

20. The exhaust system according to claim 1, wherein at least one part selected from the group separating plate, diffuser insert, cone insert, baffle plates and secondary diffuser is catalytically coated.

21. The exhaust system according to claim 1, wherein the resonance-type exhaust part consists, at least in sections, of ceramics.

22. A resonance-type exhaust apparatus for an internal combustion engine which comprises:
    a diffuser-countercone unit which includes a diffuser member that conveys exhaust gas therethrough, a countercone member that conveys exhaust gas therethrough, and a curved first connection part that deflects exhaust gas in a first arc from an outlet of said diffuser to an inlet of said countercone part,
    an inlet member which conveys exhaust gas therethrough,
    a second connection part which deflects exhaust gas in a second arc from an outlet of said inlet member to an inlet of said diffuser member,
    an end piece which conveys exhaust gas therethrough, and
    a third connection part which deflects exhaust gas in a third arc from an outlet of said countercone member to an inlet of said end piece,
    a central line of the third arc defining a plane which is approximately parallel with a plane defined by a central line of the second arc and approximately perpendicular to a plane defined by a central line of the first arc.

* * * * *